United States Patent
Hughes et al.

(10) Patent No.: US 9,374,263 B2
(45) Date of Patent: Jun. 21, 2016

(54) LATENCY DIFFERENTIAL MITIGATION FOR REAL TIME DATA STREAMS

(75) Inventors: Simon Derek Hughes, Cambridge (GB); Jim Patrick Douglas, Chesham (GB)

(73) Assignee: Avaya ECS Ltd. (GB)

( * ) Notice: Subject to any disclaimer, the term of this patent is extended or adjusted under 35 U.S.C. 154(b) by 2224 days.

(21) Appl. No.: 11/540,809

(22) Filed: Sep. 29, 2006

(65) Prior Publication Data

US 2008/0080568 A1    Apr. 3, 2008

(51) Int. Cl.
*H04L 29/06* (2006.01)
*H04J 3/06* (2006.01)

(52) U.S. Cl.
CPC ...... *H04L 29/06027* (2013.01); *H04L 65/1083* (2013.01); *H04L 65/80* (2013.01)

(58) Field of Classification Search
USPC .......................... 370/236, 252, 291, 508, 516
See application file for complete search history.

(56) References Cited

U.S. PATENT DOCUMENTS

| | | | | |
|---|---|---|---|---|
| 4,630,286 | A * | 12/1986 | Betts | 375/261 |
| 5,995,518 | A * | 11/1999 | Burns et al. | 370/503 |
| 6,414,960 | B1 * | 7/2002 | Kuhn et al. | 370/395.64 |
| 6,512,761 | B1 * | 1/2003 | Schuster et al. | 370/352 |
| 6,625,176 | B1 * | 9/2003 | Amann et al. | 370/503 |
| 2001/0029457 | A1 * | 10/2001 | Shaffer et al. | 704/504 |
| 2002/0138224 | A1 * | 9/2002 | Sessions | 702/107 |
| 2002/0181438 | A1 * | 12/2002 | McGibney | 370/350 |
| 2003/0061340 | A1 * | 3/2003 | Sun et al. | 709/224 |
| 2003/0198257 | A1 * | 10/2003 | Sullivan et al. | 370/516 |
| 2005/0281204 | A1 * | 12/2005 | Karol et al. | 370/248 |
| 2005/0286565 | A1 * | 12/2005 | Vakil et al. | 370/503 |
| 2006/0256344 | A1 * | 11/2006 | Sikora et al. | 356/477 |
| 2006/0269007 | A1 * | 11/2006 | Zhang et al. | 375/260 |
| 2007/0008928 | A1 * | 1/2007 | Kezys | 370/331 |

OTHER PUBLICATIONS

M. Handley, "RFC 4566: SDP: Session Description Protocol," Jul. 2006, Network Working Group, pp. 1-38.*
Thomas Little, "Network Considerations for Distributed Multimedia Object Composition and Communication," Nov. 1990, IEEE Network Magazine, Iss. 6, pp. 32-40.*

* cited by examiner

*Primary Examiner* — Dang Ton
*Assistant Examiner* — Ryan Kavleski

(57) ABSTRACT

Techniques for mitigating effects of differing latencies associated with real time data streams in multimedia communication networks. For example, a technique for mitigating a latency differential between a first media path and a second media path, over which a first device and a second device are able to communicate, includes the following steps. A training phase is performed to determine a latency differential between the first media path and the second media path. Prior to the first device switching a media stream, being communicated to the second device, from the first media path to the second media path, the first device synchronizes the media stream based on the determined latency differential such that a latency associated with the switched media stream is made to be substantially consistent with a latency of the second media path.

13 Claims, 8 Drawing Sheets

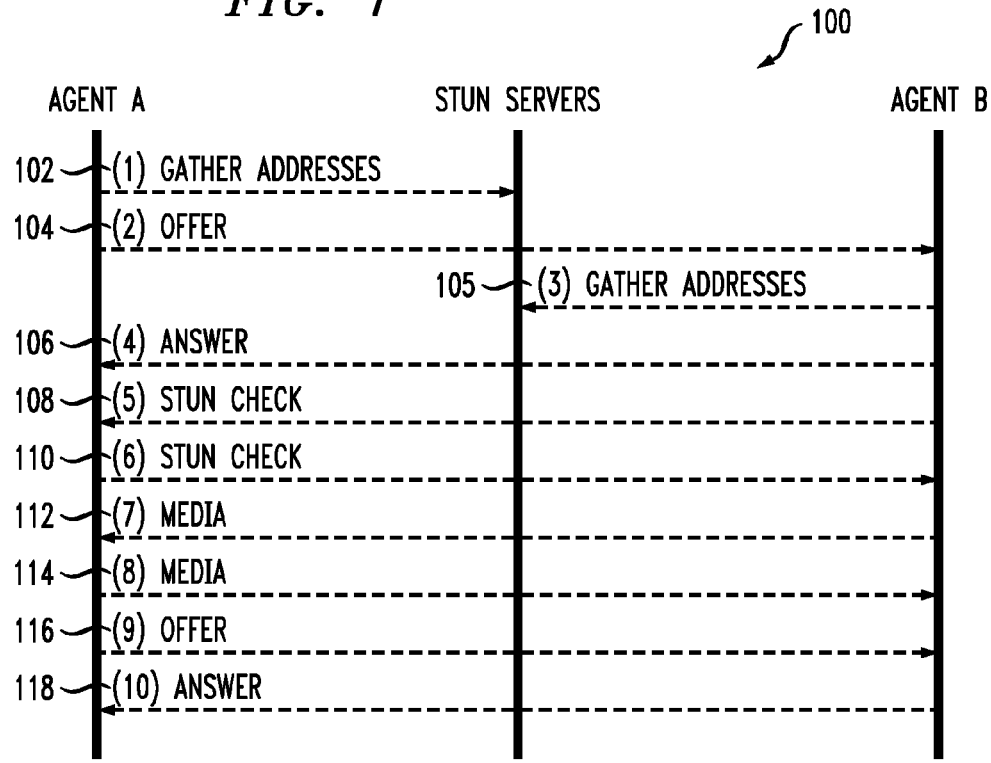

LATENCY DIFFERENTIAL MITIGATION FOR REAL TIME DATA STREAMS

FIELD OF THE INVENTION

The present invention generally relates to multimedia communication networks and, more particularly, to techniques for mitigating effects of differing latencies associated with real time data streams in such networks.

BACKGROUND OF THE INVENTION

The Interactive Connectivity Establishment (ICE) proposal, developed by the Internet Engineering Task Force (IETF) Multiparty Multimedia Session Control (MMUSIC) working group, provides a methodology for Network Address Translation (NAT) traversal. In particular, the methodology allows Session Initiation Protocol (SIP)-based Voice over Internet Protocol (VoIP) clients to successfully traverse the firewalls that may exist between a remote user and a network.

In order to allow a SIP-based VoIP data stream to traverse a firewall, the ICE methodology performs real time switching between media transports (paths) as the data stream passes through the firewall. However, the two media transports may typically have differing data latency characteristics. As a result, switching between the two media transports causes participants in the VoIP call, which the data stream is associated with, to experience media artifacts such as an audible click. The ICE methodology specifies no solution for this differential latency problem.

It is clear that the differential latency problem caused by real time media transport switching at a firewall is not limited to audio data streams, but rather can plague other types of media data streams. For example, switching of differing latency transport paths that carry video data can result in unwanted media artifacts such as video glitches.

Accordingly, there is a need for techniques for mitigating effects caused by differing latencies associated with real time data streams in multimedia communication networks.

SUMMARY OF THE INVENTION

Principles of the invention provide techniques for mitigating effects of differing latencies associated with real time data streams in multimedia communication networks.

For example, in one aspect of the invention, a technique for mitigating a latency differential between a first media path and a second media path, over which a first device and a second device are able to communicate, includes the following steps. A training phase is performed to determine a latency differential between the first media path and the second media path. Prior to the first device switching a media stream, being communicated to the second device, from the first media path to the second media path, the first device synchronizes the media stream based on the determined latency differential such that a latency associated with the switched media stream is made to be substantially consistent with a latency of the second media path.

Advantageously, illustrative principles of the invention enable a seamless, intra-session switching between two media transports (e.g. IP telephony voice streams or video streams) of differing latency without introducing a media artifact (e.g., an audible click or video glitch). Such inventive principles can be used to transparently upgrade a stream from a lower quality of service (higher latency) stream to a stream of a higher quality of service (lower latency), or vice versa for stream degradation. Users will benefit from improved quality of service, and service providers will benefit from a more efficient use of limited network resources.

As will be evident, principles of the invention are particularly important for the emerging IETF ICE standard for overcoming SIP NAT firewall traversal problems where ICE agents perform real time switching between media transports.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 illustrates existing ICE call flow.

FIG. 2 illustrates an SDP offer including candidate attributes.

DETAILED DESCRIPTION OF PREFERRED EMBODIMENTS

Figure 3:
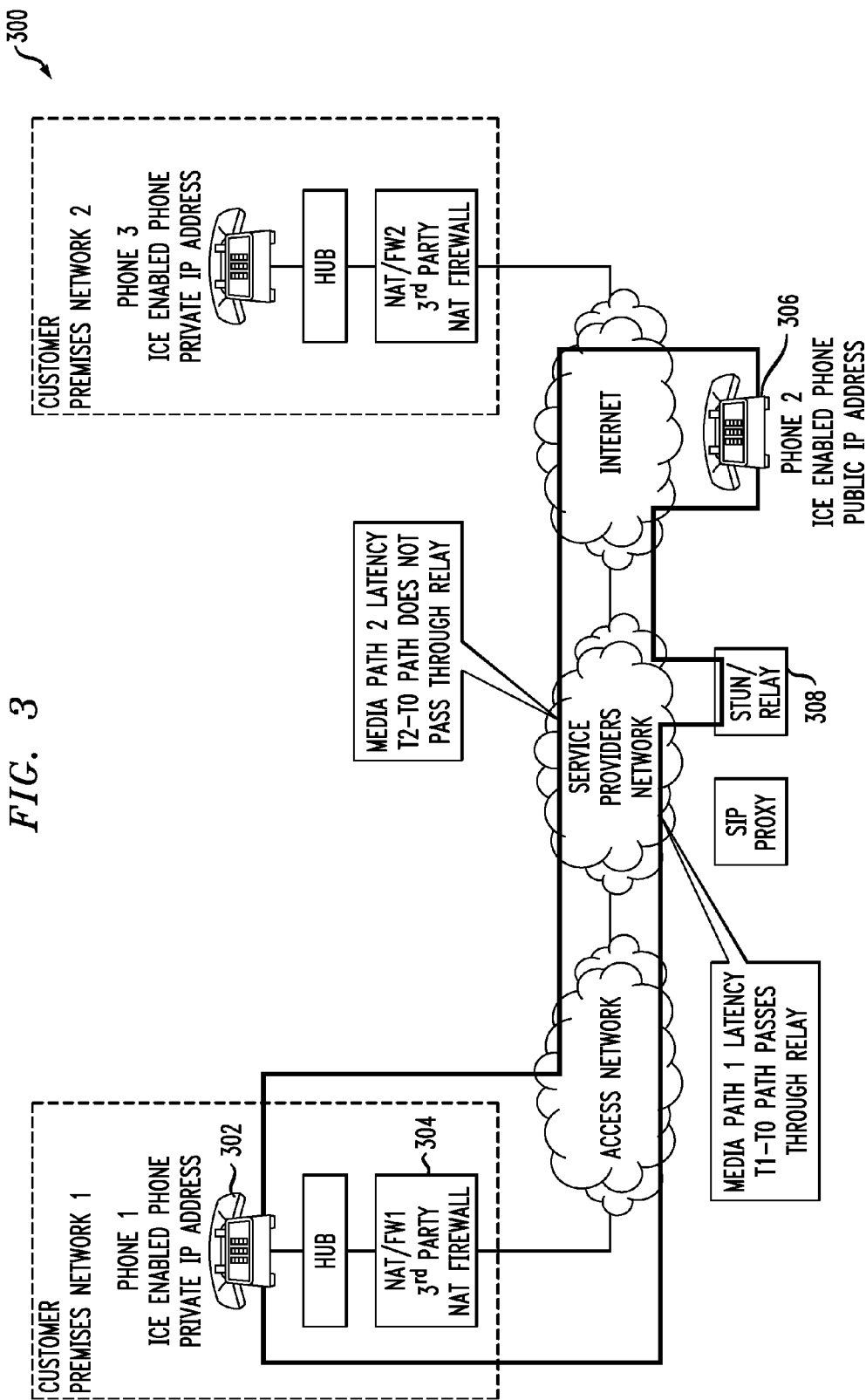
FIG. 3 illustrates ICE negotiated media paths through a network.

It is to be appreciated that while the present invention will be described below in the context of a network having SIP-based VoIP capability, the invention is not so limited. That is, the present invention is more generally applicable to any communication network in which it would be desirable to provide differential latency mitigation for real time data streams. For example, principles of the invention may be used in accordance with Video over Internet Protocol clients.

Further, it is to be understood that the term "agent" used herein is intended to mean any computing device, or a portion of any computing device, that is part of a communication network. By way of one example only, in the context of a SIP-based VoIP application, one agent may be a remote user device (e.g., an ICE enabled phone) while another agent may be a computing device (e.g., another ICE enabled phone) in the communication network with which the remote user wishes to communicate. Still further, it is to be understood that the term "packet" may be more generally referred to as a "data unit" or a "data sample."

FIG. 1 illustrates an example of an existing ICE call flow 100. As is known, the existing ICE methodology gathers transport addresses for inclusion in the Session Description Protocol (SDP) offer attached to the SIP invite. Before the offering device (offerer), agent A in FIG. 1, establishes a session, it obtains local transport addresses from its operating system. In the case of a SIP telephony call, for example, a local transport address is obtained for the Real-time Transport Protocol (RTP) stream and another local transport address for the Real-time Transport Control Protocol (RTCP) stream.

In addition to the local transport addresses, agent A obtains a server reflexive transport address from a public server known as a Simple Traversal of User Datagram Protocol (UDP) through NAT (STUN) server, and a server relay transport address from a STUN relay. This is denoted as step 1: Gather Addresses (102) in FIG. 1. These addresses are usually allocated through a single STUN Allocate request which provides both the reflexive and relay addresses.

As a part of the call flow process, the offering device gathers such addresses such that they can be included as candidates in the offer. Each candidate is listed in a set of a=candidate attributes in the offer. FIG. 2 shows an example offer 200 containing three candidates, each with two components. Note that this example uses the SDP format described in draft-ietf-mmusic-ice-08.txt and is subject to change in subsequent drafts. The first candidate (202):

a=candidate $L1 1 UDP 1.0 $L-PRIV-1.IP $L-PRIV-1.PORT a=candidate $L1 2 UDP 1.0 $L-PRIV-2.IP $L-PRIV-2.PORT includes the local private IP address and port for the RTP stream (first line above) and RTCP stream (second line above). The second candidate (204):

a=candidate $L2 1 UDP 0.7 $NAT-PUB-1.IP $NAT-PUB-1.PORT a=candidate $L2 2 UDP 0.7 $NAT-PUB-2.IP $NAT-PUB-2.PORT includes the IP address and port of the public NAT interface mapping (reflexive address) for the RTP stream (first line above) and RTCP stream (second line above). The third candidate (206):

a=candidate $L3 1 UDP 0.3 $STUN-PUB-2.IP $STUN-PUB-2.PORT a=candidate $L3 2 UDP 0.3 $STUN-PUB-3.IP $STUN-PUB-3.PORT includes the IP address and port of the relay allocated transport address for the RTP stream (first line above) and RTCP stream (second line above). Note also the media line 207:

m=audio $STUN-PUB-2.PORT RTP/AVP 0 which identifies the third candidate as the active candidate to negotiate first, as the relay transport address offers the best guarantee that a connection will be established between the peers irrespective of the intervening NAT type.

Having gathered the transport addresses and compiled the SDP, the offer is then sent to the answering device (answerer), Agent B in FIG. 1. This is denoted as step 2: Offer (104) in FIG. 1. The answerer then follows a similar procedure as the offerer, gathering a set of transport addresses. This is denoted as step 3: Gather Addresses (105) in FIG. 1. The addresses are grouped into candidates and Agent B responds with an answer. This is denoted as step 4: Answer (106) in FIG. 1.

Once the offer/answer exchange has been completed, the agents compute an ordered list of candidate pairs and begin connectivity checks for the first pair in the list. Both agents start with the pair that contains the active media candidates. The connectivity checks are performed using peer-to-peer STUN requests sent from one agent to another. This is denoted as steps 5 and 6: STUN Check (108 and 110) in FIG. 1. As soon as the active candidate has been verified by the STUN checks, media can begin to flow between agents A and B. This is denoted as steps 7 and 8: Media (112 and 114) in FIG. 1.

The priority of the second and subsequent candidate pairs in the ordered list is computed according to the assigned candidate priority in the a=candidate lines, a number in the range 0.0-1.0. After media begins to flow for the first candidate pair, agents A and B continue to the next candidate pair in the ordered list, which may have higher priority than the active candidate pair. After a higher priority candidate has been verified by the offerer (Agent A in FIG. 1), it ceases additional connectivity checks and sends an updated offer which promotes the higher priority candidate to the media line. This is denoted as step 9: Offer (116) in FIG. 1. The answerer (Agent B in FIG. 1) responds with an answer, as described above. This is denoted as step 10: Answer (118) in FIG. 1. This process can result in the active media session being switched from the relayed path to a lower latency, non-relayed path as illustrated in FIG. 3.

FIG. 3 illustrates ICE negotiated media paths through network 300. More particularly, FIG. 3 shows the media paths between phone 1 (302) located on a private network behind an address and port dependent NAT firewall (304), and a publicly addressable phone 2 (306) on the public Internet. The first media stream established between the peers (phones 1 and 2) is Media Path 1 passing through the STUN/Relay server (308) in the service providers network. The second stream negotiated (Media Path 2) does not require the use of the relay and therefore is likely to be a lower latency path. When the peers (phone 1 and phone 2) switch from media stream 1 to media stream 2, an artifact will be introduced into time sensitive flows due to the differential latency between the media paths, resulting in an audible click or a video glitch.

Figure 4:
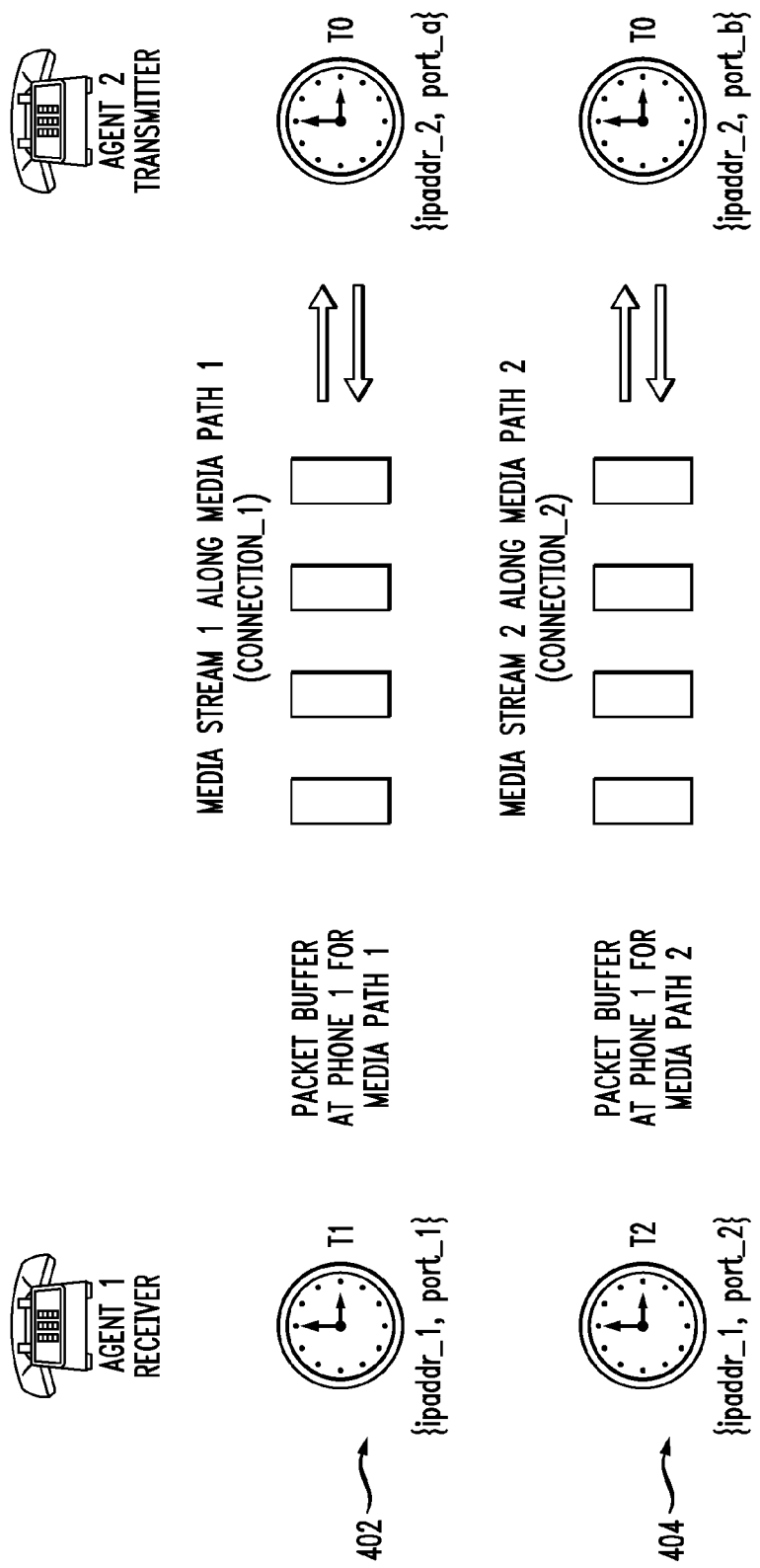
FIG. 4 illustrates differential latencies of ICE negotiated media paths.

The upper part (402) of FIG. 4 illustrates the flow of RTP packets from phone 2 to phone 1. At time $T_0$, a packet is sent from phone 2 which travels along media path 1 to arrive at phone 1 at time $T_1$. The packet is placed into a jitter buffer (packet buffer 1) to smooth out variations in arrival time. The latency of this media path is:

Latency of Media Path 1 (MP1) on connection_1 = $T_1 - T_0$

The lower part (404) of FIG. 4 shows packets flowing along the new media path 2. At time $T_0$, a packet is sent from phone 2 which travels along media path 2 to arrive at phone 1 at time $T_2$. The latency of this path is:

Latency of Media Path 2 (MP2) on connection_2 = $T_2 - T_0$

Therefore, the differential latency is:

Difference Latency $\Delta T = (T_1 - T_0) - (T_2 - T_0) = T_1 - T_2$.

Figure 5:
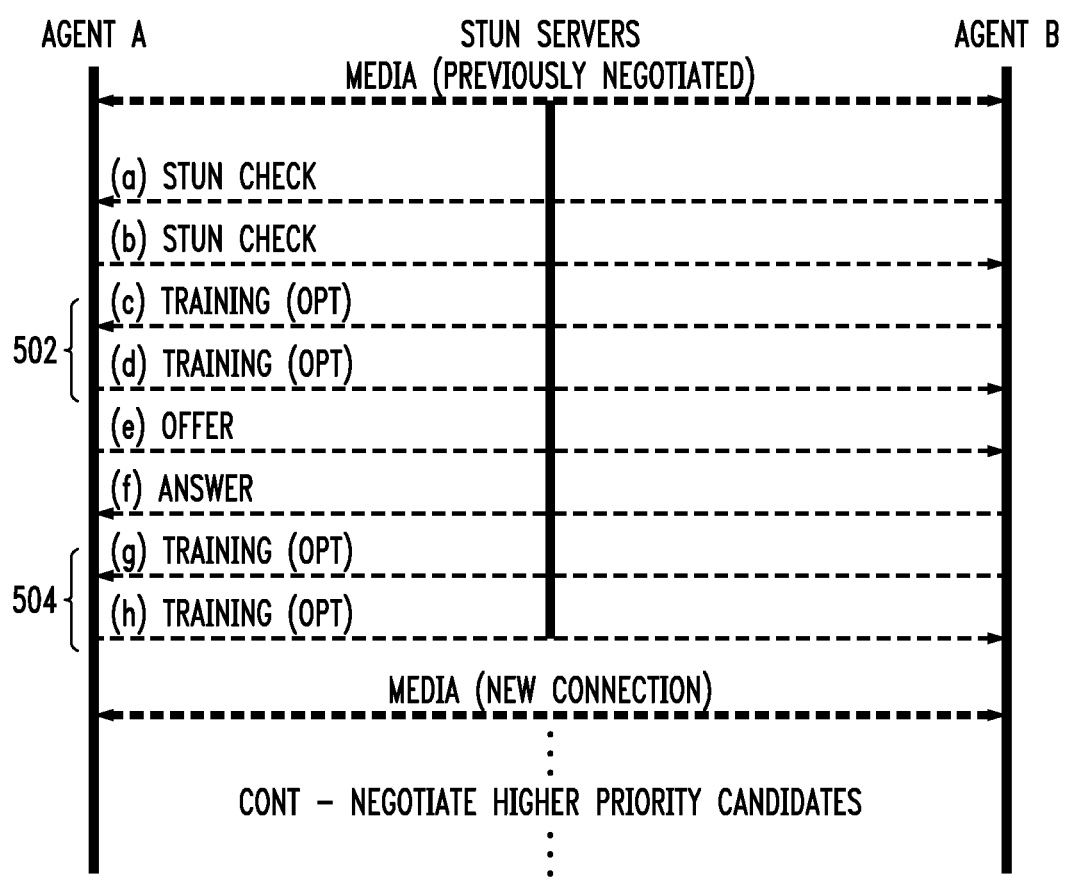
FIG. 5 illustrates enhanced ICE call flow, according to an embodiment of the invention.

To overcome the differing latency problem, principles of the invention provide for the communicating peers to perform a training phase to characterize the differential latency between the two media paths prior to the onset of media transmission. This is illustrated in the context of ICE call flow 500 in FIG. 5. It is to be appreciated that the training phase can be conducted before (502), during and/or after (504) an updated offer/answer exchange is made between peers.

Consider the situation illustrated in FIG. 4 where agent 2 is transmitting media packets on the tuple {ipaddr_2, port_a} to the receiving agent 1 listening at tuple {ipaddr_1, port_1}. This connection_1 is identified by the 4-tuple {ipaddr_2, port_a, ipaddr_1, port_1}. Packets on this connection travel along media path 1 with latency $T_1 - T_0$. Connectivity has already been verified for the connection from {ipaddr_2, port_b} to {ipaddr_1, port_2}, the media path 2 with latency $T_2 - T_0$. This connection_2 is identified by the 4-tuple {ipaddr_2, port_b, ipaddr_1, port_2}.

Figure 6:
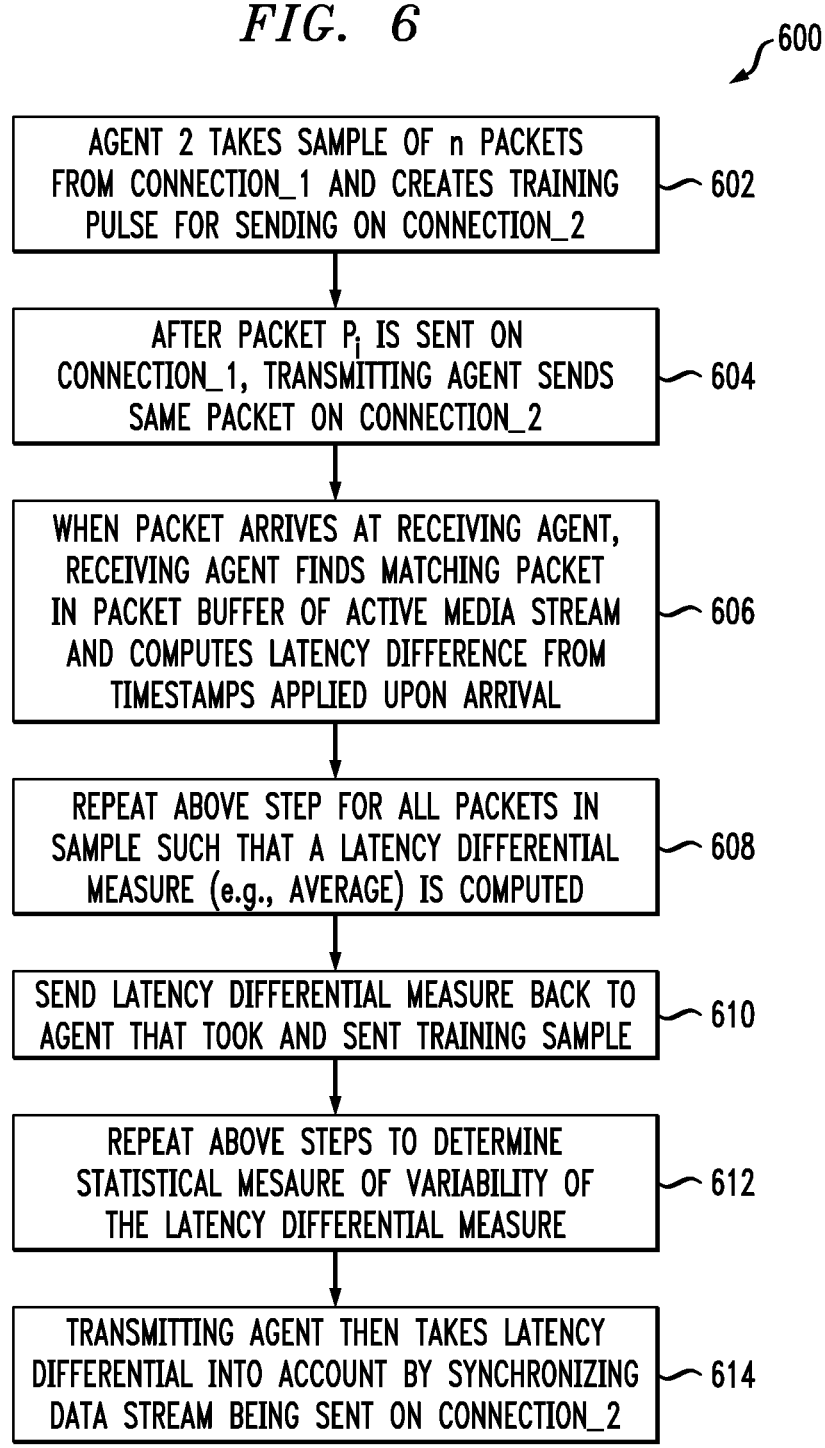
FIG. 6 illustrates a training phase, according to an embodiment of the invention.

The training methodology for use in switching from connection_1 to connection_2 without introducing a media artifact is depicted in FIG. 6.

As shown in methodology 600, agent 2 takes a sample of n packets P={$p_0, p_1, \ldots, p_{n-1}$} from connection_1 and creates a training pulse for sending on connection_2 (602). Immediately after packet $p_i$ from packet sample P is sent on connection_1, the transmitting agent sends the same packet on connection_2 (604). When the packet arrives at the receiving agent, the receiver finds the matching packet in packet buffer of the active media stream (packet buffer 1 in FIG. 4) and computes the latency difference from the timestamps applied upon arrival (606).

This step is repeated for all packets in the sample P so that a latency differential measure can be computed (608). This may be a latency differential average, for example. If a packet is lost en-route, then it is omitted from the computation. Having computed the measure, the measure is communicated back to the peer that sent the training pulse (610). Note that these operations are also performed for packet transmission in the opposite direction, i.e., from agent 1 to agent 2.

Then, the sending peer may repeat the above operation to obtain a statistical measure of variability of the latency differential measure, using the standard deviation for example, for the variability in the measure between the media paths (612). This training process enables the sending agent to synchronize the two media streams (614).

For example, the sending agent selects a point in time Ts to stop sending media packets on connection_1 and to start sending media packets on connection_2. After Ts, no more media packets are sent on connection_1. Ts is selected to coincide with an event in the data stream such that detection of the event at the receiver signifies the termination of the training phase. Such an event may be signalled in-band or out-of-band with respect to the media stream. In so doing, the transmitter synchronizes the new media stream to take into account the latency differential T1–T2 resulting in the seamless switchover to the lower latency path (an example of such synchronization is described below in the context of FIGS. 7-9). The detection of the event at the receiver (in the example the receipt of a silence insertion frame on {ip_addr1, port_2}) results in media packets being drained from packet buffer 1 attached to {ip_addr1, port_1} before dispatching packets from packet buffer 2 bound to {ip_addr1, port_2}. The receiving peer will be unaware of any changes in the latency of the media path.

At times $t > T_s$, the sending agent identifies periods of silence in the transmitted media stream and incrementally removes the differential latency $T_1 - T_2$, eventually decreasing the latency of connection_2 to $T_2 - T_0$.

An alternative and related approach is for the sending agent to transmit the media stream on both connection_1 and connection_2 simultaneously, and allow the receiver to indicate when transmission on connection_1 is no longer required. In such alternative embodiment, the receiving agent goes through the same matching and latency differential computing steps. This may be appropriate where there are no bandwidth limitations.

In the case that the training phase is performed before the updated offer/answer exchange, the latency differentials can be communicated between peers using a new attribute in the SDP offer and answer, or by an alternative method.

An important consideration is the size of latency differential between the relayed and non-relayed media streams. If the difference is of the order of one media sample (typically 20 milliseconds for an RTP stream), then the detrimental effect of the media switchover is likely to be small. However, if the difference is of the order of the 10 media samples, then the latency difference will have a noticeable and undesirable effect.

Layer 3 network elements including routers and fast path packet forwarders (relays) introduce latencies of the order of one media sample, which is likely to be acceptable. However, the greater problem lies in the additional router hops introduced by the necessity to route media packets to and from the relay in comparison to a direct route between peers. In the case that the STUN/Relay is located on the public Internet, the latency differential will be significant and may exceed an acceptable latency budget. A similar but less severe case could occur in the collocation facilities of a large service provider where access is gained over a commodity xDSL (Digital Subscriber Lines) service. Such networks are not engineered to ensure latency requirements and variability on the order of 10 media samples is common.

Figure 7:
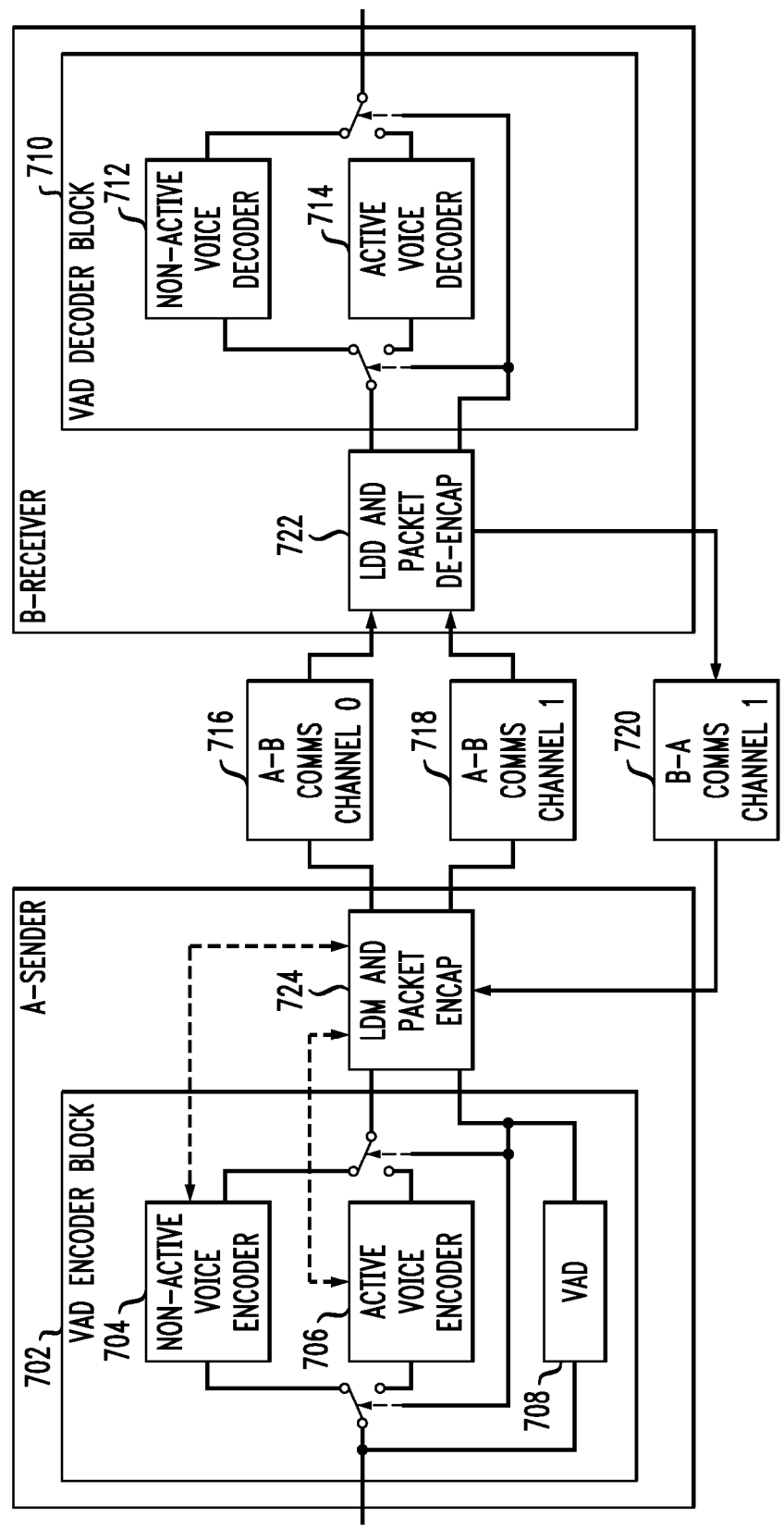
FIG. 7 illustrates a system for mitigating latency differential, according to an embodiment of the invention.
Figure 8:
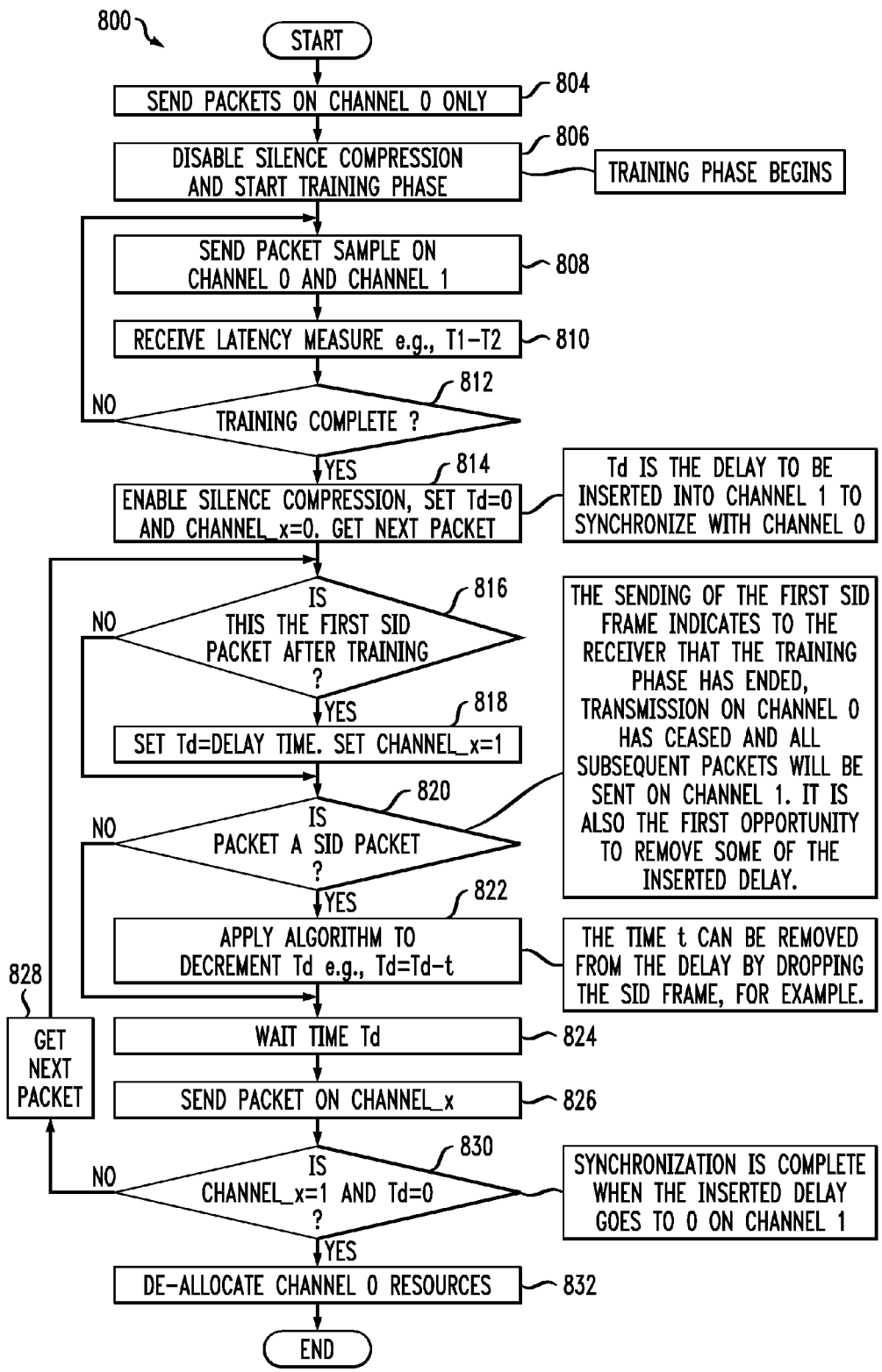
FIG. 8 illustrates a latency differential mitigation sender algorithm, according to an embodiment of the invention.
Figure 9:
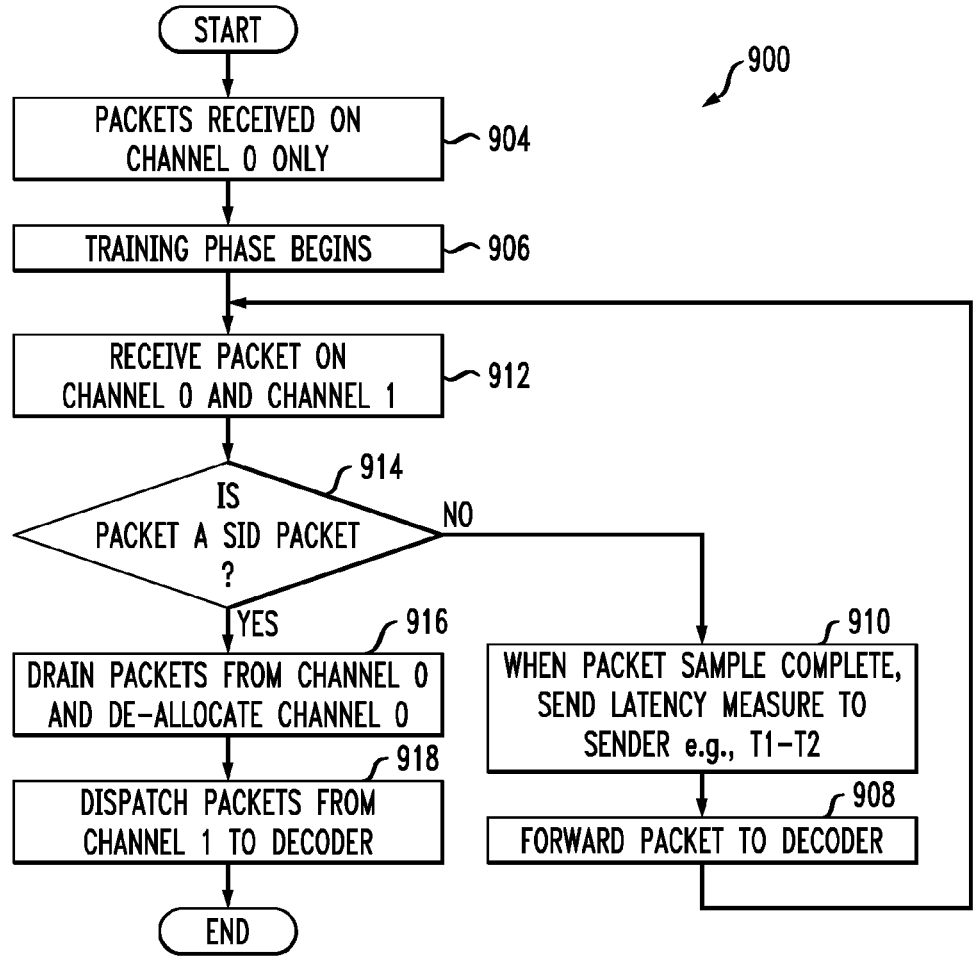
FIG. 9 illustrates a latency differential determination receiver algorithm, according to an embodiment of the invention.

Turning now to FIGS. 7-9, an example shows how latency differential mitigation may be implemented for ITU-T Recommendation G.729: Coding of Speech at 8 kbit/s using Conjugate-Structure Algebraic-Code-Excited Linear-Prediction (CS-ACELP) with silence compression, such as described in ITU-T Recommendation G.729 Annex B: A silence compression scheme for G.729 optimized for terminals conforming to Recommendation V.70.

As shown, voice activation detection (VAD) encoder block 702 includes non-active voice encoder 704, active voice encoder 706 and voice activation detector 708. The functions of these elements are well known and described in detail in the G.729 standard. They perform functions equivalent to the voice encoding performed to the left of the communication channel in Figure B.1/G.729 of Annex B of the standard. Therefore, their functions are not further described here in detail. Similarly, the elements labelled VAD decoder block 710, namely, non-active voice decoder 712 and active voice decoder 714, are well known and equivalent to the voice decoding performed to the right of the communication channel in Figure B.1/G.729 of Annex B of the standard, and thus not further described herein.

In addition, the following functional blocks are shown between sender A and receiver B:

A-B Comms Channel 0 (labelled 716). This is the higher latency communication channel used to transmit packets from sender A (blocks 702 and 724) to receiver B (blocks 710 and 722). This would typically be the first transmit communication channel to be established using ICE. Block 716 can be identified with connection_1.

A-B Comms Channel 1 (labelled 718). This is the lower latency communication channel used to transmit packets from sender A to receiver B. This would typically be the second transmit communication channel to be established using ICE. Block 718 can be identified with connection_2.

B-A Comms Channel 1 (labelled 720). This is the channel for transmitting packets from receiver B back to sender A.

However, in accordance with an illustrative embodiment of the invention, two functional blocks have been added:

Latency Differential Determination (LDD) & Packet De-encapsulation (labelled 722). The LDD accepts packets from both communication channels and computes the latency differential between channels 0 and 1. The differential is communicated back to the sender via the B-A communication channel.

Latency Differential Mitigation (LDM) & Packet Encapsulation (labelled 724). The LDM receives the latency differential measure sent by the receiver, and implements the process for delay insertion and deletion into the packet stream (i.e., synchronization).

FIG. 8 shows an example algorithm 800 that may be implemented in the LDM functional block (724) in sender A. First, packets are sent on channel 0 only (804). After communication channel 1 has been established, the LDM disables silence compression and begins the training phase (806) by sending packets from the packet sample on both channels 0 and 1 (808). The sender waits to receive the latency differential measure from the receiver (while still sending speech packets) (810) and continues to send sample packets until enough measures are received to compute the delay metric.

When this process has been completed (812), the LDM enables silence compression, initializes the delay time Td=0 and the transmit channel, channel_x, to be channel 0 (814), before waiting for the VAD encoder unit to generate a Silence Insertion Descriptor (SID) frame. In the case that the encoder generates an active voice frame before the first SID frame, the packet is sent without delay (824) on channel 0 (826). However, the generation of the first SID frame (816) is the trigger used to switch packet transmission from channel 0 to channel 1 and synchronize the channel 1 stream by delaying packet transmission by a non-zero delay time (818). This delay time Td is computed from the latency measures received during training.

For SID frames (820), an algorithm is applied to decrement the delay time by an interval t (822), which may be as simple as dropping the frame at step 826 and adjusting the delay time Td accordingly. The LDM waits for time Td (824) before proceeding to send (or drop in the simple case) the packet (826). This process of incrementally decreasing the latency differential during periods of silence is repeated until the delay time Td reaches 0 (830 and 828). For active voice frames generated by the encoder after the first SID packets, the packet is delayed by the current value of the delay time Td (824) before being sent (826). Channel 0 resources are de-allocated in step 832.

FIG. 9 shows an example algorithm 900 that may be implemented in the Latency Differential Determination (LDD) functional block in receiver B. To begin, packets are only received on channel 0 (904) but the training phase begins with the receipt of the first packet on channel 1 (906, 912). During the training phase, no SID frames will be received and identical packets received in channel 0 and 1 packet buffers are used to compute a latency measure (910). This is communicated back to the sender when data for a complete sample have been collected. Only one copy of the packet is forwarded to the decoder (908).

The receipt of a SID frame in channel 1 is the trigger indicating that the training phase has ended (914) and subsequently, packets will only be received on channel 1. Any remaining packets in the channel 0 packet buffer are forwarded to the decoder before de-allocating resources for channel 0 (916). All subsequent packets received on channel 1 are then forwarded to the decoder (918).

Figure 10:
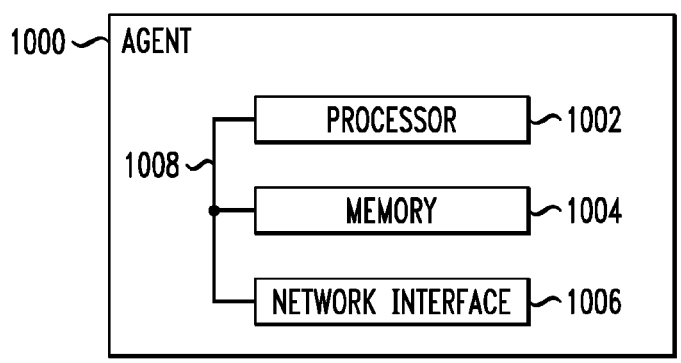
FIG. 10 illustrates a computing architecture of a device for use in implementing enhanced ICE call flow, according to an embodiment of the invention.

Lastly, FIG. 10 illustrates a computing architecture 1000 of a device for use in implementing enhanced ICE call flow, according to an embodiment of the invention. That is, FIG. 10 may be considered a computing architecture used to implement an agent associated with a VoIP client device. The architecture of FIG. 10 may also be considered a computing architecture of the sender and the receiver shown in FIG. 7. Of course, it is to be understood that the invention is not limited to any particular computing system implementation.

In this illustrative implementation, a processor 1002 for implementing at least a portion of the methodologies of the invention is operatively coupled to a memory 1004 and a network interface 1006 via a bus 1008, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Further, the phrase "network interface" as used herein is intended to include, for example, one or more devices capable of allowing the computing system 700 to communicate with other computing systems. Thus, the network interface may comprise a transceiver configured to communicate with a transceiver of another computer system via a suitable communication protocol.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1002.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
  establishing a communication session between a first device and a second device over a first path, wherein the first path is defined by candidate information that is contained in a Session Description Protocol (SDP) message;
  determining, at the first device, a latency differential between the first path and a second path, wherein:
    (i) the second path connects the first device with the second device,
    (ii) the first path and the second path are at least partially disjoint, and
    (iii) the second path is defined by candidate information that is contained in the Session Description Protocol (SDP) message;
  delaying, at the first device, the transmission of packets from a media stream along the second path by a time interval, wherein the magnitude of the time interval depends on the latency differential; and
  preventing an introduction of a media artifact in the communication session by use of the time interval.

2. The method of claim 1, wherein the latency differential is determined by:
   (i) transmitting a first packet along the first path from the first device to the second device,
   (ii) transmitting a second packet along the second path from the first device to the second device, and
   (iii) calculating the difference between the time of arrival of the first packet at the second device and the time of arrival of the second packet at the second device.

3. The method of claim 2, wherein the second packet is a copy of the first packet.

4. The method of claim 1 comprising:
   ceasing a transmission of the media stream along the first path; and
   incrementally decreasing the latency of the second path; wherein the decreasing operation is executed after the transmission of the media stream along the first path has ceased; and
   wherein the ceasing and decreasing operations are executed by the first device.

5. The method of claim 1 comprising receiving at the first device an indication of the value of the latency differential.

6. The method of claim 1, wherein the time interval by which packets from the media stream are delayed depends on a measure of variability of the latency differential.

7. The method of claim 1 comprising:
   identifying a period of silence in the media stream; and
   decreasing the time interval by which packets from the media stream are delayed during the period of silence;
   wherein the identifying and decreasing operations are performed by the first device.

8. The method of claim 2, wherein:
   the media stream is simultaneously transmitted from the first device to the second device along both the first path and the second path;
   the first packet is part of the media stream; and
   the second packet is part of the media stream.

9. The method of claim 1, wherein the first device and second device are Voice over Internet Protocol clients.

10. The method of claim 1, wherein the first device and the second device are Video over Internet Protocol clients.

11. The method of claim 1, wherein the media stream represents one or more voice packets or one or more video packets associated with a communication being conducted between the first device and the second device.

12. An apparatus for mitigating a latency differential between a first media path and a second media path over which a first device and a second device are able to communicate, comprising:
   a memory; and
   at least one processor associated with the first device, which is coupled to the memory and operative to: (i) establish a communication session between the first device and the second device; (ii) determine a latency differential between the first media path and the second media path; (iii) delay a transmission of packets from a media stream along the second path by a time interval, wherein the magnitude of the time interval depends on the latency differential; and (iv) prevent an introduction of a media artifact in the communication session by use of the time interval.

13. An apparatus for mitigating a latency differential between a first path and a second path over which a first device and a second device are able to communicate, comprising:
   a memory; and
   at least one processor associated with the second device, which is coupled to the memory and operative to: (i) participate in a training phase, initiated by the first device, to determine a latency differential between the first path and the second path; (ii) delay the transmission of packets from a media stream along the second path by a time interval, wherein the magnitude of the time interval depends on the latency differential; and (iii) prevent an introduction of a media artifact in a communication between the first device and the second device by use of the time interval.

* * * * *